United States Patent
Huber et al.

(10) Patent No.: US 11,424,654 B2
(45) Date of Patent: Aug. 23, 2022

(54) INSULATION, ELECTRICAL MACHINE, AND METHOD FOR PRODUCING THE INSULATION

(71) Applicant: Siemens Aktiengesellschaft, Munich (DE)

(72) Inventors: Jürgen Huber, Erlangen (DE); Steffen Lang, Hallerndorf (DE); Niels Müller, Nuremberg (DE); Igor Ritberg, Fürth (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 47 days.

(21) Appl. No.: 16/968,406

(22) PCT Filed: Feb. 7, 2019

(86) PCT No.: PCT/EP2019/053049
§ 371 (c)(1),
(2) Date: Aug. 7, 2020

(87) PCT Pub. No.: WO2019/154933
PCT Pub. Date: Aug. 15, 2019

(65) Prior Publication Data
US 2020/0403475 A1    Dec. 24, 2020

(30) Foreign Application Priority Data
Feb. 9, 2018   (DE) .................... 10 2018 202 061.2

(51) Int. Cl.
*H02K 3/40* (2006.01)
*H02K 3/30* (2006.01)
*H02K 15/10* (2006.01)

(52) U.S. Cl.
CPC ............. *H02K 3/40* (2013.01); *H02K 3/30* (2013.01); *H02K 15/105* (2013.01)

(58) Field of Classification Search
CPC ...... H02K 15/00; H02K 15/10; H02K 15/105; H02K 3/40; H02K 3/30; H01B 3/40; H01B 3/46; B32B 27/28; B32B 27/38
See application file for complete search history.

(56) References Cited

U.S. PATENT DOCUMENTS

| | | | |
|---|---|---|---|
| 6,242,096 B1 | 6/2001 | Wolter | .............. C07F 7/08 |
| 8,871,343 B2 | 10/2014 | Kikuchi et al. | ............... 428/372 |

(Continued)

FOREIGN PATENT DOCUMENTS

| | | | |
|---|---|---|---|
| AT | 288715 B | 3/1971 | ............. C08G 59/12 |
| CN | 1854221 A | 11/2006 | ........... C09D 179/08 |

(Continued)

OTHER PUBLICATIONS

Russian Office Action, Application No. 2020128156/07, 7 pages, dated Mar. 4, 2021.

(Continued)

*Primary Examiner* — Tran N Nguyen
(74) *Attorney, Agent, or Firm* — Slayden Grubert Beard PLLC (57) ABSTRACT

Various embodiments include a sprayable formulation for production of a multilayer insulation for an electrical machine, especially a rotating electrical machine in the high-voltage or mid-voltage sector, for example a generator, transformer, which is subjected to higher rated voltages at operating voltages, i.e., for example, over and above 1 kV or more. The invention also relates to an electrical machine comprising such an insulation; the invention finally relates to a method of producing the multilayer insulation. This comprises spraying of various formulations with or without (Continued)

intermediate, especially metallic, interfaces and is automatable.

9 Claims, 2 Drawing Sheets

(56) References Cited

U.S. PATENT DOCUMENTS

| | | | |
|---|---|---|---|
| 8,927,865 B2 | 1/2015 | Hanawa et al. | 174/110 R |
| 10,950,365 B2 | 3/2021 | Hanawa et al. | |
| 2001/0048355 A1 | 12/2001 | Irwin | H01F 7/00 |
| 2003/0113441 A1 | 6/2003 | Baumann | B05D 5/12 |
| 2003/0113465 A1 | 6/2003 | Baumann et al. | 427/425 |
| 2007/0213492 A1 | 9/2007 | Mowrer | C01G 77/06 |
| 2012/0145432 A1 | 6/2012 | Yamaguchi et al. | 174/110 SR |
| 2012/0222884 A1 | 9/2012 | Honda et al. | 174/120 SR |
| 2013/0203897 A1 | 8/2013 | Kornmann et al. | 523/459 |
| 2014/0326481 A1 | 11/2014 | Gröppel et al. | H01B 3/04 |
| 2015/0001983 A1* | 1/2015 | Hildinger | H01B 17/44 310/196 |
| 2015/0279510 A1 | 10/2015 | Hanawa et al. | 428/372 |
| 2016/0272809 A1 | 9/2016 | Takeuchi | 523/456 |

FOREIGN PATENT DOCUMENTS

| | | | | |
|---|---|---|---|---|
| CN | 102585663 A | 7/2012 | | C09D 163/00 |
| CN | 102682884 A | 9/2012 | | H01B 7/02 |
| CN | 102708953 A | 10/2012 | | H01B 7/02 |
| CN | 104637628 A | 5/2015 | | H01B 13/00 |
| CN | 104952516 A | 9/2015 | | C09D 5/24 |
| CN | 105 449 955 | 3/2016 | | H02K 15/10 |
| CN | 105900183 A | 8/2016 | | H01B 3/30 |
| CN | 106009527 A | 10/2016 | | C08G 59/42 |
| CN | 107545948 A | 1/2018 | | H01B 13/02 |
| DE | 196 50 288 | 7/1998 | | C09D 183/06 |
| DE | 10 2011 083 228 | 3/2013 | | H01B 3/04 |
| DE | 10 2012 205 563 | 10/2013 | | H02K 3/40 |
| EP | 1 354 916 | 10/2003 | | C08L 63/02 |
| EP | 3 217 410 | 9/2017 | | H01B 7/08 |
| JP | 2010 074 908 | 4/2010 | | H02K 3/34 |
| RU | 2076361 C1 | 3/1997 | | G21F 9/18 |
| RU | 2524599 C2 | 7/2014 | | C08F 290/06 |
| SU | 399142 A3 | 9/1973 | | C08G 59/12 |
| WO | 97 43816 | 11/1997 | | H02K 3/24 |
| WO | 98 32138 | 7/1998 | | H01B 3/40 |
| WO | 0148895 | 7/2001 | | H02K 15/10 |
| WO | 2010/112491 A1 | 10/2010 | | C08F 290/06 |
| WO | 2013 045224 | 4/2013 | | H02K 3/40 |
| WO | 2019 057601 | 3/2019 | | H02K 3/30 |

OTHER PUBLICATIONS

Chinese Office Action, Application No. 201980012071.4, 19 pages, dated Apr. 27, 2021.
Russian Office Action, Application No. 2020128157/07, 8 pages, dated Mar. 18, 2021.
Search Report for International Application No. PCT/EP2018/053048, 10 pages, dated May 31, 2019.
Office Action for DE Application No. 10 2018 202 058.2, 9 pages, dated Aug. 23, 2018.
Search Report for International Application No. PCT/EP2018/053049, 10 pages, dated Jun. 11, 2019.
Office Action for DE Application No. 10 2018 202 061.2, 7 pages, dated Jan. 15, 2019.
Chinese Office Action, Application No. 201980012041.3, 21 pages, dated Jun. 3, 2021.

* cited by examiner

INSULATION, ELECTRICAL MACHINE, AND METHOD FOR PRODUCING THE INSULATION

CROSS-REFERENCE TO RELATED APPLICATIONS

This application is a U.S. National Stage Application of International Application No. PCT/EP2019/053049 filed Feb. 7, 2019, which designates the United States of America, and claims priority to DE Application No. 10 2018 202 061.2 filed Feb. 9, 2018, the contents of which are hereby incorporated by reference in their entirety.

TECHNICAL FIELD

The present disclosure relates to insulation. Various embodiments may include sprayable formulations for production of a multilayer insulation for an electrical machine, electrical machines comprising such an insulation, and/or methods of producing a multilayer insulation.

BACKGROUND

Ever higher-power electrical machines, for example generators, are being developed since advancing technology is requiring ever higher power densities. A high-power generator, for example a turbo generator, especially has a stator with a stator lamination stack and a multitude of generator grooves containing the generator insulation system, generally in the form of a winding. The main insulation of generators, based on epoxy resin-impregnated mica tapes, ensures shielding of the conductors that are under high voltage, especially copper conductors, against the grounded stator. It has a high partial discharge use voltage, which enables it to dissipate 3.5 kV per millimeter, for example, over a prolonged period.

The most important constituents of the insulation system, viewed from the inside outward, are the conductors, especially copper conductors, i.e. the electrical coil, that are compressed with one another to form what are called Roebel bars, optionally an internal potential controller applied to the bars, the main insulation, and the outer corona shield thereon, and optionally a terminal corona shield.

The generator winding and/or motor winding leaves the generator grooves at each end of the lamination stack. At these points, what is called a terminal corona shield is then mounted on the outer corona shield to control the electrical potential, for example to raise the potential over the length of the terminal corona shield. All these constituents of the insulation system, i.e. internal potential controller, main insulation, outer corona shield and terminal corona shield, have to date generally been wound as tapes onto the conductor components, with parts thereof, such as the terminal corona shield, being applied completely by hand.

The other parts cannot be applied in an automated manner either, either because the quantity means that automation is uneconomic and/or the risk of trapped air in the folds means that the quality required in the winding is not assured. Once all the windings of the insulation system have been made, they are impregnated with impregnation resin, then the impregnated insulation is cured—for example in an oven— to give the thermoset.

The operation of the electrical rotating machine gives rise to high voltages that are dissipated in the insulation volume between the conductor bar at high voltage and the lamination stack at ground potential. Excess increases in field occur here at the edges of the laminations in the lamination stack, and these in turn cause partial discharges. When they meet the insulation system, these partial discharges lead to very significant local heating. This breaks down the organic materials of the insulation system gradually to low molecular weight, volatile products, for example to $CO_2$.

The tapes that are wound generally consist of bonded mica platelets which, in the insulation, serve to extend the erosion pathway in the insulation system, i.e. the direct path from the high-voltage side, i.e. the conductors, to the grounded lamination stack, which results in a much longer lifetime of an insulation system.

SUMMARY

The teachings of the present disclosure counter the disadvantages of a wrapping tape insulation, and lower the costs of production of an insulation system for a rotating electrical machine of the high-voltage or mid-voltage sector, for example a generator, transformer, a bushing and/or a cable, which is subjected to relatively high rated voltages at operating voltages, i.e., for example, over and above 1 kV or more. For example, some embodiments include an insulation of a conductor of an electrical rotating machine, said insulation comprising two or more layers producible by sprayable lacquer formulations, wherein at least one mechanically supporting lacquer layer together with a partial discharge-resistant lacquer layer form adjoining layers of the insulation.

In some embodiments, at least one partial discharge-resistant lacquer layer is a sprayable lacquer formulation, a resin mixture or a resin-curing agent mixture comprising a monomeric and/or oligomeric resin component based on silicon oxide, siloxane, silazane, vinyl, silane/vinyl, silane/acrylate and/or silane/methacrylate and/or other lacquer formulations having a high inorganic and/or mineral component.

In some embodiments, at least one mechanically supporting lacquer layer is composed of a sprayable lacquer formulation comprising a resin mixture or a resin-curing agent mixture composed of a carbon-based compound.

In some embodiments, there are multiple alternately applied partial discharge-resistant and mechanically supporting lacquer layers.

In some embodiments, the insulation is producible by spraying a lacquer formulation as powder coating.

In some embodiments, the insulation is producible by spraying a liquid lacquer formulation with solvent.

In some embodiments, the insulation is producible by spraying a liquid lacquer formulation without solvent.

In some embodiments, there are at least partly alternating, full-area lacquer layers in radial direction around the conductor.

In some embodiments, there is at least one ultrathin layer interface for formation of a lacquer layer in the electrostatic powder coating spray method.

In some embodiments, the ultrathin layer comprises one or more atomic layers of metal as interface.

In some embodiments, there is a continuous layer structure composed of a mechanically supporting layer with intervening partial discharge-resistant lacquer layers in the form of an intermittent lacquer layer and distributed in a scale design.

In some embodiments, the insulation is producible in an automatable method.

As another example, some embodiments include an electrical machine comprising an insulation as described herein as internal potential controller, main insulation, outer corona shield and/or terminal corona shield.

In some embodiments, the insulation is producible by spraying various lacquer formulations onto a conductor.

In some embodiments, the conductor is moved during the spraying.

In some embodiments, at least one lacquer formulation is sprayed onto the conductor at least partly through a stencil.

DETAILED DESCRIPTION

In some embodiments, an insulation of a conductor of an electrical rotating machine comprises two or more layers producible by sprayable lacquer formulations, wherein at least one mechanically supporting lacquer layer together with a partial discharge-resistant lacquer layer form adjoining layers of the insulation.

"Adjoining" in the present context means that the two layers or sheets of a mechanically supporting lacquer formulation on the one hand and of a partial discharge-resistant lacquer formulation on the other hand are adjacent, although it is not an absolute prerequisite that they form a common interface.

In some embodiments, the lacquer layers are sprayable by means of a powder coating method in an electrostatic design, for example. For this purpose, however, it would be more difficult with increasing radial distance of the spray lacquer layer to be applied to apply the voltage to the underlayers needed by the electrostatically sprayable powder coating. In some embodiments, the method includes applying an ultra-thin, electrically conductive interface layer to an already sprayed and dried layer by sputtering, chemical vapor deposition, etc. The thickness of this electrically chargeable interface layer, the interface, may even only be a few atomic layers thick for the technique of electrostatic powder coat spraying to work again. In some embodiments, a partial discharge-resistant lacquer formulation contains at least one sprayable resin mixture having a monomeric and/or oligomeric resin component based on silicon oxide, siloxane, silazane, vinyl, silane/vinyl, silane/acrylate and/or silane/methacrylate and/or other lacquer formulations having a high inorganic and/or mineral component.

In some embodiments, there are one or more compounds usable as curing agent that are based on carbon and/or based on silicon oxide, siloxane and/or silazane or based on other abovementioned partial discharge-resistant lacquer formulations that result in part of a sprayable formulation.

In some embodiments, there is an electrical rotating machine having such an insulation and/or a method of producing an insulation for an electrical rotating machine by spraying a solid powder coating, a liquid solvent-borne lacquer and/or a liquid solvent-free lacquer.

In some embodiments, it is possible to dispense with mica platelets as conventionally used in all tape and/or wound insulations, which are not sprayable because they are simply too large, when the resin basis used is a resin and/or a resin mixture having partial discharge resistance. In some embodiments, the resistance of a sprayable resin is increased by addition of relatively fine mica powders when at least some of the resin is exchanged for a partial discharge-resistant component such as one based on siloxane and/or silazane, i.e. one having a $—[SiR_2—O—]_n$- and/or $—[—Si—NR_3—]_n—$ backbone. For instance, it is possible to dispense with the use of the mica platelets stuck to the tape and to formulate and produce the insulation material in the form of a sprayable solution.

In some embodiments, the formulation further comprises fillers sufficiently small that they are applicable by a spray nozzle.

In some embodiments, the insulation is produced by spraying at least one partial discharge-resistant resin mixture or resin-curing agent mixture onto the conductor to be insulated. Partial discharge-resistant resins and resin mixtures are, for example, those in which the polymeric constituent present is a component with a $—[SiR_2—O]_n—$ and/or $—[—Si—NR_3—]_n—$ backbone as secondary constituent of the resin mixture and/or resin-curing agent mixture, i.e. to an extent of less than 50 mol %, especially to an extent of less than 40 mol % and/or to an extent of less than 30 mol % of the polymerizable resin mixture and/or resin-curing agent mixture.

In some embodiments, the resin mixture and/or resin-curing agent mixture is a mixture in which at least some of the resin mixture and/or resin-curing agent mixture that cures to a thermoset for the complete insulation is a siloxane- and/or silazane-containing compound that forms a $—[SiR_2—O—]_n$- and/or $—[—Si—NR_3—]_n—$ backbone in the thermoset. "R" here represents hydrogen and/or all kinds of organic radicals that are suitable for curing and/or crosslinking to give an insulant usable for an insulation system. More particularly, R represents -aryl, -alkyl, -heterocycles, nitrogen-, oxygen- and/or sulfur-substituted aryls and/or alkyls.

In some embodiments, R may be the same or different and may represent the following groups:

hydrogen alkyl, for example -methyl, -propyl, -isopropyl, butyl, -isobutyl, -tert-butyl, -pentyl, -isopentyl, -cyclopentyl and all other analogs up to dodecyl, i.e. the homolog having 12 carbon atoms;

aryl, for example: benzyl-, benzoyl-, biphenyl-, tolyl-, xylenes and comparable aromatics, especially, for example, all aryl radicals having one or more rings whose structure meets Hückel's definition of aromaticity, heterocycles: especially sulfur-containing heterocycles such as thiophene, tetrahydrothiophene, 1,4-thioxane and homologs and/or derivatives thereof, oxygen-containing heterocycles, for example dioxanes, nitrogen-containing heterocycles, for example those having —CN, —CNO, —CNS, —N3 (azide) substituents on the ring or on the rings, and sulfur-substituted aryls and/or alkyls: e.g. thiophene, but also thiols.

The Hückel rule for aromatic compounds relates to the correlation that planar, cyclically through-conjugated molecules comprising a number of Π electrons that can be represented in the form of 4n+2 possess exceptional stability which is also referred to as aromaticity.

In some embodiments, the resin mixture and/or resin-curing agent mixture, as well as the component in monomeric and/or oligomeric form that has been functionalized for polymerization and has a —[SiR$_2$—O]$_n$—/—[—Si—NR$_3$—]$_n$— backbone, also has at least one monomeric or oligomeric resin component that has been functionalized for polymerization and has a carbon-comprising backbone—i.e. one comprising —[—CR$_2$—]$_n$— units. R here represents -hydrogen, -aryl, -alkyl, -heterocycles, nitrogen-, oxygen- and/or sulfur-substituted aryls and/or alkyls. Especially suitable are, for example, epoxy-functionalized components such as bisphenol F diglycidyl ether (BFDGE) or bisphenol A diglycidyl ether (BADGE), polyurethane and mixtures thereof. Preference is given to epoxy resins based on bisphenol F diglycidyl ether (BFDGE), bisphenol A diglycidyl ether (BADGE) or mixtures thereof.

For example, the monomeric or oligomeric component functionalized for polymerization that has a —[SiR$_2$—O]$_n$— and/or —[—Si—NR$_3$—]$_n$— backbone is combined with one or more components containing a —[—CR$_2$—]$_n$— backbone selected from the group of the following compounds to give the resin mixture and/or resin-curing agent mixture:
undistilled and/or distilled, optionally reactively diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or solvent-thinned epoxy novolak and/or epoxy phenol novolak, cycloaliphatic epoxy resins such as 3,4-epoxycyclohexylmethyl 3,4-epoxycyclohexylcarboxylate, e.g. CY179, ERL-4221; Celloxide 2021P, bis(3,4-epoxycyclohexylmethyl) adipate, e.g. ERL-4299; Celloxide 2081, vinylcyclohexene diepoxide, e.g. ERL-4206; Celloxide 2000, 2-(3,4-epoxycyclohexyl-5,5-spiro-3,4-epoxy)-cyclohexane-meta-dioxane, e.g. ERL-4234; diglycidyl hexahydrophthalate, e.g. CY184, EPalloy 5200; tetrahydrophthalic acid diglycidyl ether, e.g. CY192; glycidated amino resins (N,N-diglycidyl-para-glycidyloxyaniline, e.g. MY0500, MY0510, N,N-diglycidyl-meta-glycidyloxyaniline, e.g. MY0600, MY0610, N,N,N',N'-tetraglycidyl-4,4'-methylenedianiline, e.g. MY720, MY721, MY725, and any mixtures of the aforementioned compounds.

Suitable monomeric or oligomeric components that have been functionalized for polymerization and have a —[SiR$_2$—O—]$_n$- and/or —[—Si—NR$_3$—]$_n$— backbone are glycidyl-based and/or epoxy-terminated aryl- and/or alkylsiloxanes, for example glycidoxy-functionalized, especially glycidoxy-terminated, siloxanes. For example, a suitable siloxane is one such as 1,3-bis(3-glycidyloxypropyl) tetramethyldisiloxane, DGTMS, and/or glycidoxy-terminated phenyldimethylsiloxane and/or phenylmethylsiloxane in monomeric and/or oligomeric form, and in desired mixtures and/or in the form of derivatives. One of these components that has already been tested is the commercial product "Silres® HP® 1250®". It has been found that at least difunctionalized siloxanes usable for production of thermosets are suitable here.

Suitable curing agents are cationic and anionic curing catalysts, for example organic salts, such as organic ammonium, sulfonium, iodonium, phosphonium and/or imidazolium salts, and amines, such as tertiary amines, pyrazoles and/or imidazole compounds. Examples of these include 4,5-dihydroxymethyl-2-phenylimidazole and/or 2-phenyl-4-methyl-5-hydroxymethyl-imidazole. It is alternatively possible to use compounds containing oxirane groups, for example glycidyl ethers, as curing agents. Just like the base resin, the curing agent may alternatively or additionally be wholly or partly replaced by a compound having a —[SiR$_2$—O—]$_n$- and/or —[—Si—NR$_3$—]$_n$— backbone, also called siloxane-based compound here.

In the case of addition-crosslinking, non-homopolymerizing high polymers, di- or trianhydride (derivatives) that are solid at room temperature may be appropriate as curing agents, for example 3,3',4,4'-benzophenonetetracarboxylic dianhydride (BTDA, CAS No. 2421-28-5). Conventionally, acid anhydrides are also used successfully as curing agents in insulation materials. However, the toxicology thereof is now a matter of some controversy. Therefore, other curing agents, especially based on imidazole and/or pyrazole, are increasingly being used.

In some embodiments, the carbon-based curing agent is also wholly or partly replaced by siloxane-based curing agents having the same functionalities. It has been found that, in the insulation, there is a ratio of partial discharge-resistant resin, i.e. silicon oxide-, silazane- and/or siloxane-based compound "with —[SiR$_2$—O-]$_n$— and/or —[—Si—NR$_3$—]$_n$— backbone" to mechanically supporting resin, i.e. carbon-based resin, where the mechanically supporting resin is dominant, i.e. accounts for more than 50% by weight and/or more than 50% by volume and/or more than 50 mol %.

In some embodiments, the ratios present are, for example, as follows: partial discharge-resistant resin, i.e. silicon oxide-, silazane- and/or siloxane-based compound "with —[SiR$_2$—O—]$_n$- and/or —[—Si—NR$_3$—]$_n$— backbone" to mechanically supporting resin, i.e. carbon-based resin "with —[—CR$_2$—]$_n$— backbone", such as 1:8 to 1:4, meaning that, in the insulation in question, the hydrocarbon-based compounds are present in 4 to 8 times the quantity of the partial discharge-resistant resin components that preferably at least partly have a silicon-based backbone. The latter proportions are based here on the stoichiometry, i.e. are molar percentages.

In some embodiments, the siloxane- and/or silazane-containing component or the silicon oxide-based component is thus present in an amount of 10 to 50 mol % in the resin mixture and/or resin-curing agent mixture of the formulation. In some embodiments, the amount of siloxane-containing component in the base resin is not more than 20 mol %, especially not more than 18 mol % and more preferably not more than 15 mol %.

An optimum in the reduced erosion volume was found in the case of substitution of the conventional resin component of 20-30%. Since, however, the mechanical properties of the plastic worsen with increasing substitution, which is clearly apparent from the glass transition temperatures and/or the storage moduli, it is appropriate to substitute as little —[—CH$_2$—]$_n$— backbone as possible. In the case of about 20% substitution, the glass transition temperatures and storage moduli of the resulting resin system are almost identical to those of the conventional resin comprising solely —[—CH$_2$—]$_n$— backbone.

It has been found that, surprisingly, there is a huge increase in the partial discharge resistance of the insulant by virtue of the presence of a certain amount of —[SiR$_2$—O—]$_n$- and/or —[—Si—NR$_3$—]$_n$— forming monomers or oligomers in the base resin. The spraying of the insulation, especially of the main insulation, in layers with at least partially different formulations can achieve the effect that, for example, a layer with a particularly partial discharge-resistant formulation is sprayed and the adjoining layers are composed of a formulation that exhibits good mechanical properties; what is achieved in this way is that the sprayed insulation comprising multiple different layers is neither too brittle nor too elastic.

For example, it is also possible, according to the formulation and properties of the sprayed and cured formulation, for a layer of a very partial discharge-resistant formulation only in very thin form to be combined with adjacent layers of less partial discharge-resistant but more elastic formulations. For example, it is possible to spray two different formulations to form layers alternating in the insulation.

In some embodiments, a relatively thick layer—for example in the range from 100 µm, 150 µm, upward, to about 300 µm—of a mechanically stable formulation is sprayed on with a thinner layer of less than 100 µm, less than 70 µm, or a layer having a layer thickness in the nanometer range, for example of a siloxane- and/or silazane-containing formulation. For an electrostatic powder coat spray application to adhere to an insulation layer, for example, it is possible to provide an ultrathin metallic layer in the atomic range, i.e. having a thickness of only a few atomic layers, as an interface layer between two layers, which assures electrostatic charging for the deposition of a further layer in the powder coat spraying process. Such an interface layer may be produced via sputtering, or CVD, chemical vapor deposition, or the like.

Figure 1:
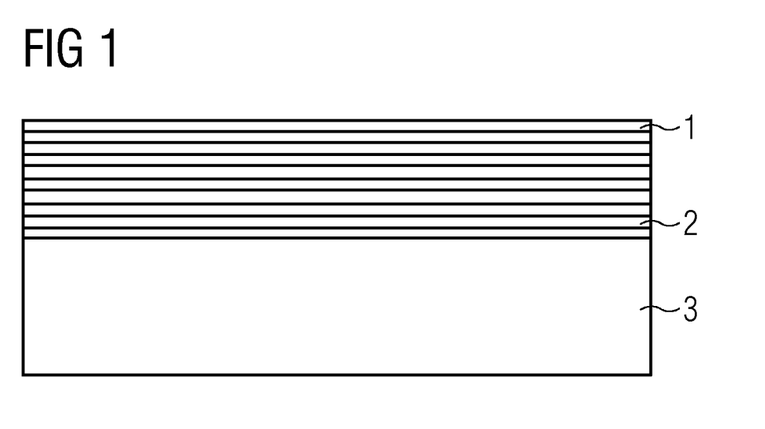
FIG. 1 shows a possible layer sequence of an insulation incorporating teachings of the present disclosure, in which complete layers are applied layer by layer, called the "onion insulation" around a conductor.
Figure 2:
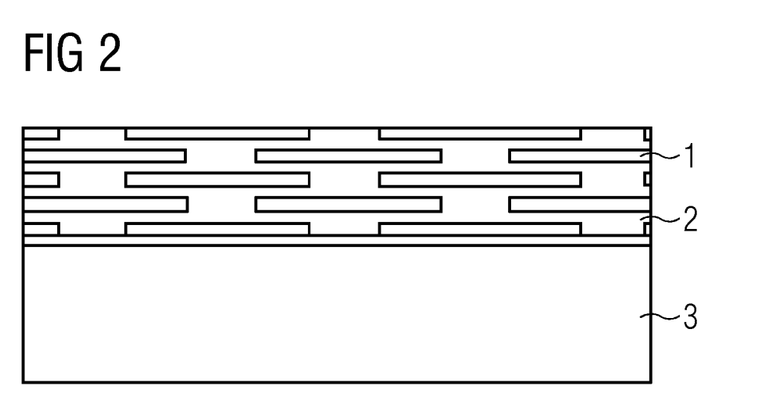
FIG. 2 shows, by contrast, the possible layer sequence incorporating teachings of the present disclosure, in which not every layer is sprayed and applied completely around the conductor, but rather so as to result in what is called a scale insulation picture over the cross section.

FIG. 1 shows a possible layer sequence of an insulation produced in one embodiment of the teachings herein, in which complete layers are applied layer by layer, called the "onion insulation" around a conductor. FIG. 2 shows, by contrast, the possible layer sequence of another embodiment incorporating teachings of the present disclosure, in which not every layer is sprayed and applied completely around the conductor, but rather so as to result in what is called a scale insulation picture over the cross section.

FIG. 1 shows, from the top downward, the thin layer 1 (shown in green) of a layer of partial discharge-resistant resin, for example a polymer that forms a —[SiR$_2$—O—]$_n$- and/or —[—Si—NR$_3$—]$_n$— backbone. This thin layer 1 may have a layer thickness in the nanometer range or a few micrometers. This is followed by a thicker layer 2 of a mechanically stable resin, for example a carbon-based resin, i.e., for example, an epoxy resin that can be considerably thicker, i.e. possibly have a thickness of up to 200µ or in the extreme case up to 300 µm. This thicker layer forms, for example, the mechanically supporting layer of the insulation. Also apparent at the bottom in FIG. 1 is the conductor 3, for example a copper bar 3.

In the "onion design" of the insulation layers 1 and 2 around the conductor 3 shown in FIG. 1, it is possible to stop the treeing channels or erosion pathways through the insulation that form in radial direction around the conductor and are to be prevented, by means of incorporation of a completely continuous layer 1—as shown here in schematic form—of partial discharge-resistant material.

Alternatively or additionally to the layer sequence shown in FIG. 1, FIG. 2 shows what is called the scale design of the insulation. What is meant by the scale design is that a lacquer layer does not lie on the lower layer as a completely covering layer, but rather takes the form of a scale, i.e. only part of the region of a lacquer layer separated from other part-regions or scales of the layer by means of the mechanically supporting lacquer layer, at the same distance from the conductor equipotential. In the insulation—for example on an equipotential line—both a mechanically supporting lacquer and a partial discharge-resistant lacquer are present, such that, in cross section, in an embedding matrix 2 of mechanically supporting resin with a low or zero proportion of partial discharge-resistant silicon oxide-, silazane- and/or siloxane-based, "—[SiR$_2$—O—]$_n$— and/or —[—Si—NR$_3$—]$_n$— backbone"-forming lacquer formulation, but with a high proportion of or formed entirely from carbon-based resin, there are fragments 1 of partial discharge-resistant lacquer distributed in the form of "scales".

Here too, the treeing channel and/or the erosion pathway through the insulation is prevented by incorporation of the partial discharge-resistant lacquer scales 1. For production of the scale design, it is possible to draw on the common knowledge of a person skilled in the art for lacquer spraying.

In some embodiments, the different layers in the scale design are not sprayed over the full area, but in such a way that the partial discharge-resistant layer is not sprayed on over the full area. The type of interruptions is as desired. For example, a helix structure is conceivable, in which spraying is effected over the rod length of the conductor 3 and this is also rotated about its own axis. Or alternatively, a slotted stencil is mounted in front of the conductor 3, through which spraying is effected. This would give rise to large-area scale structures according to the template cutouts.

The reason for the incomplete coverage of the partial discharge-resistant layer is to create what is called a continuous phase that arises from the mechanically supporting layer. By virtue of the individual mechanically supporting layers also being in contact in radial direction, i.e. transverse to the surface of the conductor 3, it is ensured that the mechanical properties of this layer are also dominant in radial direction. This application of the layers, i.e. the scale design, is similar to conventional wrapping tape insulation. This is because the mica platelets in this case correspond to the partial discharge-resistant layer applied in scale form. In that case, the impregnation resin is effectively the mechanically supporting resin layer that forms an embedding matrix for the scales. However, the partial discharge-resistant scales of the sprayed insulation have the obvious advantage over mica platelets that they can be variably adjusted freely and in an automatable manner in terms of their geometry to the respective local conditions.

There are however various methods of spray application of the partial discharge-resistant lacquer and/or the mechanically supporting lacquer. The two lacquers may be applied by the same technique or by different techniques. In some embodiments, one option is spraying as a powder coating, wherein a mixture of solids is sprayed, and a second option is spraying in liquid form, wherein spraying is effected either with or without solvent. In the case of spraying as a powder coating, the resin mixture, the resin-curing agent mixture and/or the resin-curing agent-accelerator mixture is in solid form at room temperature and/or under standard pressure. When it hits the substrate, i.e. the partial conductors of the coil, the material will either be thermally melted and/or electrostatically discharged.

For this mode of application, a siloxane-containing component which is of relatively high molecular weight, i.e., for example, one that has been chain-extended, and which is solid at room temperature is advisable. In some embodiments, it is possible, for example, to use homopolymerizing, siloxane-containing epoxides that do not need any additional curing agents. But if a curing agent is to be added, typically the curing agent or the curing agent-resin mixture is also solid at room temperature and/or standard pressure.

These formulations that are in solid form at room temperature and sprayable as a powder coating may then be applied, for example, by means of fluidized bed spraying and/or electrostatic spraying.

Curing agents used may be the following materials that are solid at room temperature and/or standard pressure:

a) di- or trianhydrides,
   3,3',4,4'-benzophenonetetracarboxylic dianhydride, "BTDA", CAS No. 2421-28-5;
   pyromellitic dianhydride, "PMDA" CAS No. 89-32-7;
   3,3',4,4'-biphenyltetracarboxylic dianhydride "s-BPDA" CAS No. 2420-87-3;
   2,2'-bis-(3,4-dicarboxyphenyl)hexafluoropropanoic dianhydride "6-FDA" CAS No. 1107-00-2;
   4,4'-oxydiphthalic anhydride "ODPA" CAS No. 1823-59-2;
   3,3',4,4'-diphenylsulfonetetracarboxylic dianhydride "DSDA" CAS No. 2540-99-0;
   4,4'-bisphenol A dianhydride "BPADA" or "ULTEM™" dianhydrides CAS No. 38103-06-9;
   hydroquinonediphthalic anhydride "HQDEA" CAS No. 17828-53-4;
   hexahydrophthalic anhydride "HHPA" CAS No. 85-42-7;
   tetrahydrophthalic anhydride isomers of THPA, CAS No. 2426-02-0 and CAS No. 935-79-5;
   cyclopentene-1,2-dicarboxylic anhydride CAS No. 3205-94-5;
   cis/trans isomers of 1,2-cyclopentanedicarboxylic anhydride, e.g. CAS No. 35878-28-5.

b) difunctional or higher-functionality amines and derivatives thereof, for example:
   2,2-bis[4-(4-aminophenoxy)phenyl]propane "BAPP" CAS No. 13080-86-9;
   4,4'-methylenedianiline "MDA" CAS No. 101-779;
   4,4'-[1,3-phenylenebis(1-methylethylidene)]bisaniline "bisaniline M" CAS No. 2687-27-6;
   4,4'-[1,4-phenylenebis(1-methylethylidene)]bisaniline "bisaniline P" CAS No. 2716-10-1)
   4,4'-oxydianiline "4,4'-ODA" CAS No. 101-80-4;
   3,4'-oxydianiline "3,4'-ODA" CAS No. 2657-87-6;
   2,2'-dimethyl-4,4'-diaminobiphenyl "m-tolidine" CAS No. 84-67-3;
   3,3'-dimethyl-4,4'-diaminobiphenyl "o-tolidine" CAS No. 119-93-7;
   3,3'-dihydroxy-4,4'-diaminobiphenyl "HAB" CAS No. 2373-98-0;
   3,3'-diaminodiphenyl sulfone "3,3'-DDS" CAS No. 599-61-1;
   4,4'-diaminodiphenyl sulfone "4,4'-DDS" CAS No. 80-08-0;
   2,2'-bis[4-(4-aminophenoxy)phenyl] sulfone "BAPS" CAS No. 13080-89-2;
   2,2'-bis[4-(3-aminophenoxy)benzene] "m-BAPS" CAS No. 30203-11-3;
   1,4-bis(4-aminophenoxy)benzene "TPE-Q" CAS No. 3491-12-1;
   1,3-bis(4-aminophenoxy)benzene "TPE-R" CAS No. 2479-46-1;
   1,3'-bis(3-aminophenoxy)benzene "APB-133" CAS No. 10526-07-5;
   4,4'-bis(4-aminophenoxy)biphenyl "BAPB" CAS No. 13080-85-8;
   4,4'-diaminobenzanilide "DABA" CAS No. 785-30-8;
   9,9'-bis(4-aminophenyl)fluorene "FDA" CAS No. 15499-84-0;
   O-tolidine sulfone "TSN" CAS No. 71226-58-9;
   methylenebis(anthranilic acid) "MBAA" CAS No. 7330-46-3;
   1,3'-bis(4-aminophenoxy)-2,2-dimethylpropane "DANPG" CAS No. 115570-52-0
   and derivatives thereof.

It is also possible to use high-melting isocyanates, esterimides, etherimides, esteramides. The advantage of the solid anhydride derivatives and especially amine derivatives as curing agents is that prior melting, especially a single instance thereof, with an epoxy resin and/or siloxane epoxy resin which is solid at room temperature and/or standard pressure and/or under standard conditions gives rise to a melt that solidifies homogeneously. A solidified melt obtained in this way can be pulverized again immediately or after storage, is easy to mix stoichiometrically and has the best possible shelf life in blended form. On spraying and on encountering the hot metal surface, the powder which has been produced from the solidified melt—for example— melts again and begins to crosslink immediately.

Particularly the amine derivatives mentioned then do not require any long-lasting oven curing periods either, but merely post-curing phases in the form of short segments at significantly lower temperatures.

In some embodiments, it is also possible to spray a liquid lacquer, i.e. the resin-curing agent system in liquid form or dissolved in a solvent. This spraying can be effected using compressed air or without compressed air. In the case of spraying with solvent, there is a distinct rise in the viscosity of the resin-curing agent mixture when the solvent evaporates. This means that, when the resin-curing agent mixture has been sprayed onto a hot metal surface, its viscosity rises to such an extent that it can no longer run.

On the other hand, the spraying of solvent-containing mixtures requires wait periods between two successive applications, for it to be ruled out that solvent is still present in a lower layer. This is especially because solvent in a lower layer in the course of curing at elevated temperature would lead to pore formation, in which there is then a risk of electrical discharges in the course of operation.

In the case of spraying without solvent, no wait periods would be necessary, and it would be possible to spray multiple layers one on top of another relatively quickly until the desired insulation thickness has been attained. Without solvent, there will also be no outgassing of any low molecular weight constituent in the course of heating of the insulation system, by means of which a pore-free insulation system is producible. For there to be an increase nevertheless in the viscosity of the sprayed resin-curing agent system after the spraying, it is suggested that the sprayed resin-curing agent system be partly gelated by means of UV and/or IR curing when it hits the surface to be coated. In principle, it is possible in particular to spray filler-free layers without solvent, by means of which it is possible to avoid the formation of pores.

Whether with or without solvent, the lacquer sprayed on is ultimately subjected to post-curing for completion, which can be effected thermally and/or via irradiation. A sprayed layer of the insulation system has a thickness in the nanometer range up to a few micrometers and/or from 50 μm to 300 μm, 50 μm to 130 μm and from 70 μm to 120 μm.

In the case of electrical rotating machines such as those in the focus of the present disclosure, insulation thicknesses in the range from 700 μm up to about 6 mm are required, such that the sprayed insulation systems always have to be applied in multiple layers.

In some embodiments, the sprayable formulation includes at least one polymerizable component comprising a resin-curing agent system, and one or more fillers. A polymerizable component is understood to mean a mixture of at least one compound containing a —[SiR$_2$—O—]$_n$- and/or —[—Si—NR$_3$—]$_n$— containing backbone and one compound containing a —[—CH$_2$—]$_n$— containing backbone.

In some embodiments, the polymerizable component is selected from thermosets and/or thermoplastics.

In some embodiments, solvents present in the sprayable liquid formulation may be dimethylformamide, 2-butanone, acetone and/or 1-butanol.

By virtue of the use of fine-grain mica as filler, the particles formed therefrom have comparatively low abrasiveness, and they can therefore be sprayed in a simple manner in the form of a particle lacquer suspension by means of a nozzle onto a conductor in order to obtain an insulation system. A sprayed formulation, whether in the form of a powder coating or in the form of a liquid formulation with or without solvent, especially for production of the main insulation, enables partly or fully automated production of the insulation system, including of insulation systems adapted individually to the respective machine.

Furthermore, spray methodology enables an increase in the power density of electrically rotating machines, assuming that the sprayed insulation system has the same electrical lifetime as a conventional insulation system comprising corona shield tape, tape adhesive, tape accelerator, winding applied by hand in some cases, followed by resin impregnation, optionally under reduced pressure, and ultimately full resin curing. The reason for that lies in the resulting insulation geometry which is the inevitable result when a tape is wound around a square profile of a conductor.

Figure 3:
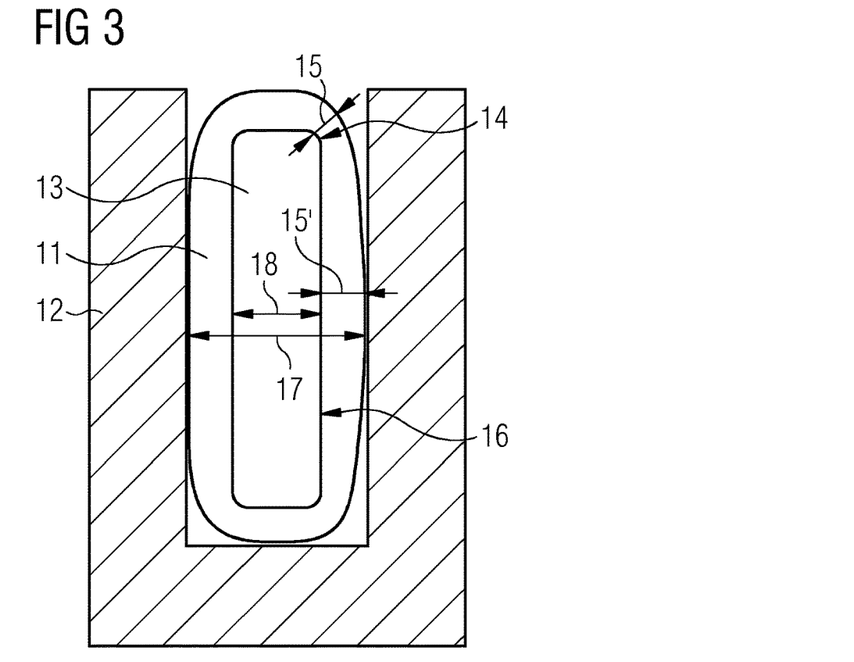
FIG. 3 shows the state of the art with mica tape insulation wound around the conductor.
Figure 4:
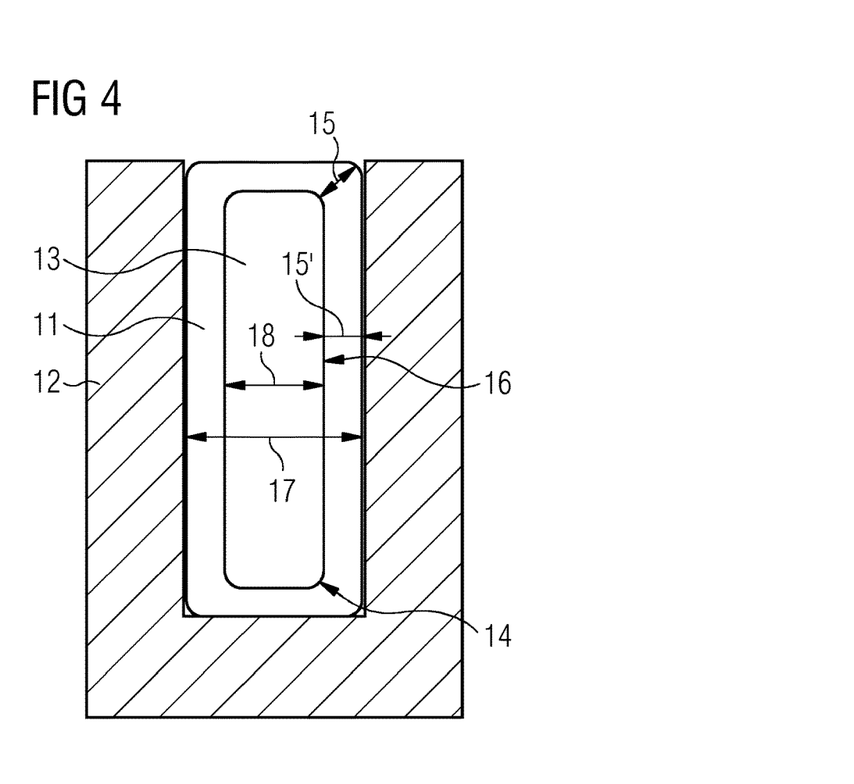
FIG. 4 shows a spray insulation applied in the form of a sprayable formulation incorporating teachings of the present disclosure.

In this regard, FIGS. 3 and 4 show:

FIG. 3 the state of the art with mica tape insulation wound around the conductor, and FIG. 4 the spray insulation which is applied in the form of a sprayable formulation.

FIG. 3 shows the state of the art, the conventionally used wound insulation system 11 around the square profile of the conductor 13, for example a copper conductor, in the laminated stack 12. It is shown here in detail how the winding thickness 15 is lower at the edges 14 than the winding 15' on the flat side. This is a simple consequence of the winding 15, which simply lies tighter to the edges 14 than to the flat sides 16. For example, a winding thickness 15 of 2.2 mm is measured at the edge 14, whereas a winding thickness 15 of 2.7 mm is measurable at the flat side 16.

But the electrical field strength at curves and especially at edges is naturally always much higher than on flat components or regions such as the flat side 16. It has been shown that, in 95% of all electrical breakdowns of an insulation system, especially at elevated voltages, the insulation breaks down at the bar radius, i.e. at the edge 14 in the example shown here. This means that an insulation system should sensibly be designed such that it has the insulation thickness corresponding to the expected lifetime at the edge 14. In the prior art shown here, this means quite clearly that the other regions, especially the flat regions, must be much thicker than required for electrical purposes. This gives rise to unnecessary material costs, component volumes, unnecessary hindrance of thermal cooling, reduction of power density and, overall, worsening of the machine.

FIG. 4 shows, by contrast, the sprayed-on insulation system according to a working example of the teachings herein. This again shows the square profile 13 of the conductor, but no longer the wound insulation system and instead the sprayed insulation system 11 according to the invention in the lamination stack 12. By virtue of the specific technique of spraying, it is possible, as shown in FIG. 4, to increase the insulation thicknesses 15 at the edges 14 and on the other hand, for example, to save material at the flat sides 16. For example, it is possible at the edges 14 to achieve insulation thicknesses 15 of 2.4 mm without difficulty by spraying, while simultaneously enabling reduction in the insulation thickness 15' at the flat sides 16 according to the lower probability of electrical breakdown, for example, to 2.2 mm.

By virtue of the reduction in the insulation thickness 15' at the flat sides 16, however, it is possible to distinctly increase the thickness 18 of the conductor 13 and hence the current rating of the conductor 13 by more than 8% in the example shown, by 8.3%. In the case of a total thickness 17 of the conductor 13 insulated with the insulation system 11 that has been sprayed or produced by winding in the lamination stack 12 of 17.4 mm, for example, the conductor 13, according to the prior art, i.e. FIG. 3, can assume a maximum width 18 of 12 mm, whereas, according to the invention, as shown in FIG. 4, it may have a width of up to one mm more, i.e. a width 18 of 13 mm. Such an enlarged conductor 13 may of course also transport different levels of current. By means of the sprayable insulation, especially also main insulation, it is accordingly possible to generate very distinct increases in power of electrical rotating machines.

The comparison of the wound and sprayed insulation correspondingly shows a distinct optimization of power by means of the sprayable insulation in an electrical rotating machine.

The invention claimed is:

1. An insulation for a conductor of an electrical rotating machine, said insulation comprising:
   two or more layers produced by spraying lacquer formulations;
   wherein a first layer comprises a mechanically supporting lacquer layer; and
   a second layer adjoining the first layer includes a partial discharge-resistant lacquer layer;
   at least partly alternating, full-area lacquer layers in radial direction around the conductor; and
   an ultrathin layer as interface for formation of a lacquer layer in the electrostatic powder coating spray method.

2. The insulation as claimed in claim 1, wherein the second layer comprises a sprayable lacquer formulation, a resin mixture, or a resin-curing agent mixture including: a monomeric and/or oligomeric resin component based on silicon oxide, siloxane, silazane, vinyl, silane/vinyl, silane/acrylate and/or silane/methacrylate.

3. The insulation as claimed in claim 1, wherein the first layer comprises a sprayable lacquer formulation having a resin mixture or a resin-curing agent mixture composed of a carbon-based compound.

4. The insulation as claimed in claim 1, comprising multiple alternately applied partial discharge-resistant and mechanically supporting lacquer layers.

5. The insulation as claimed in claim 1, wherein the layers are produced by spraying a lacquer formulation as powder coating.

6. The insulation as claimed in claim 1, wherein the layers are produced by spraying a liquid lacquer formulation with solvent.

7. The insulation as claimed in claim 1, wherein the layers are produced by spraying a liquid lacquer formulation without solvent.

8. The insulation as claimed in claim 1, wherein the ultrathin layer comprises one or more atomic layers of metal as interface.

9. The insulation as claimed in claim 1, further comprising a continuous layer structure composed of a mechanically supporting layer with intervening partial discharge-resistant lacquer layers in the form of an intermittent lacquer layer and distributed in a scale design.

\* \* \* \* \*